Feb. 16, 1965 J. H. LORIMOR 3,169,784
TRAILER HITCH WITH DISENGAGEMENT PREVENTING MEANS
Filed Oct. 13, 1961 2 Sheets-Sheet 1
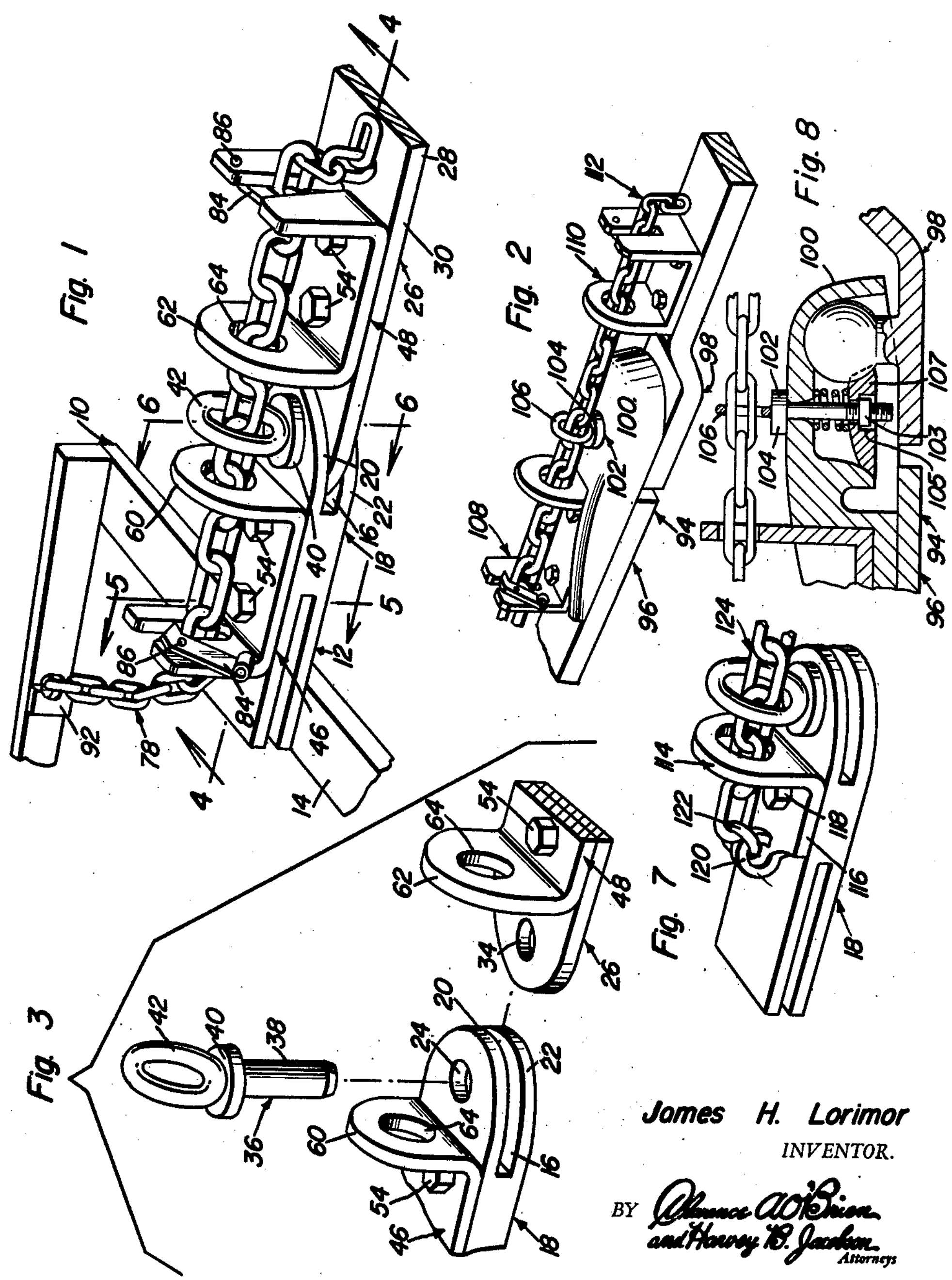

Feb. 16, 1965 J. H. LORIMOR 3,169,784
TRAILER HITCH WITH DISENGAGEMENT PREVENTING MEANS
Filed Oct. 13, 1961 2 Sheets-Sheet 2
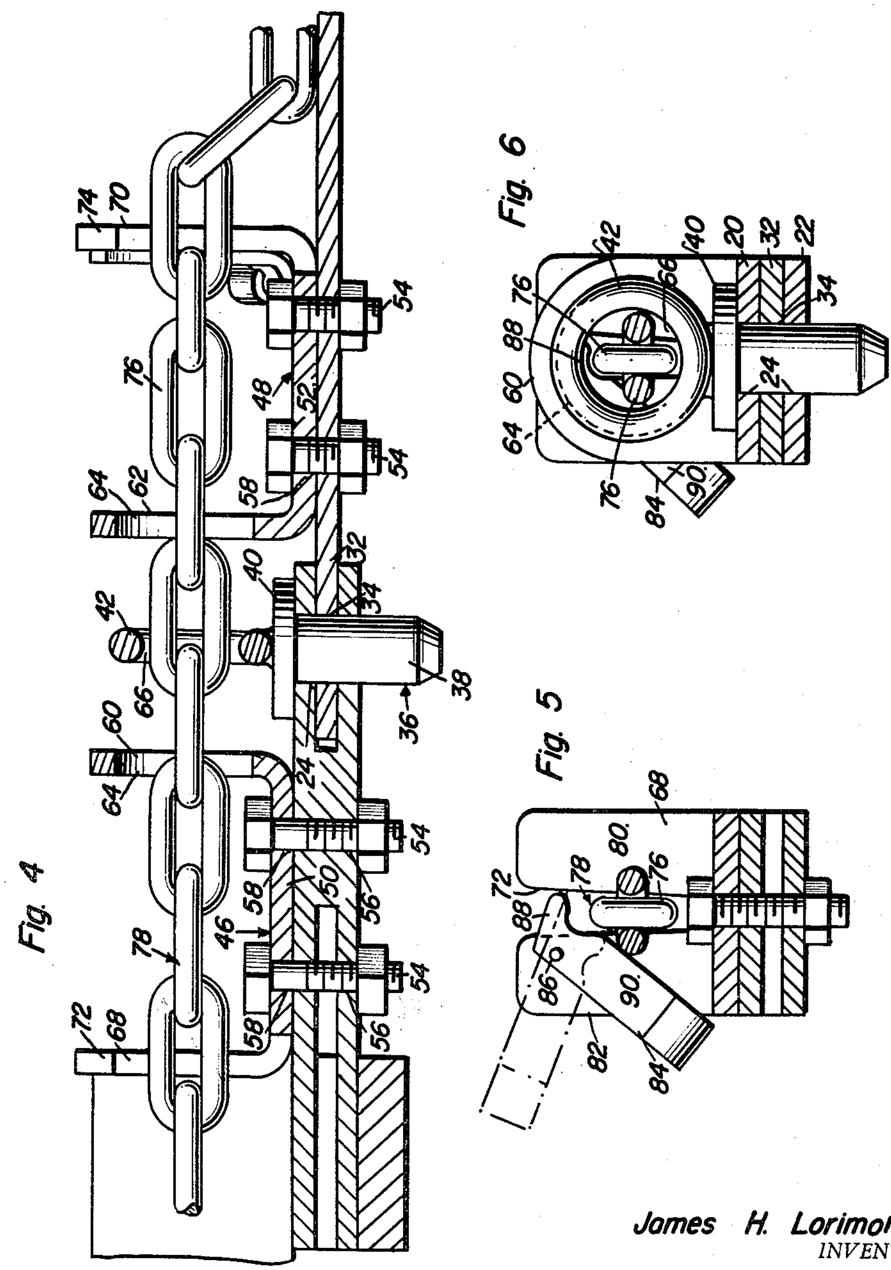
James H. Lorimor
INVENTOR.
BY Clarence A. O'Brien
and Harvey B. Jacobson
Attorneys

United States Patent Office 3,169,784

Patented Feb. 16, 1965

3,169,784

TRAILER HITCH WITH DISENGAGEMENT PREVENTING MEANS

James H. Lorimer, R.F.D. 1, Shenandoah, Iowa

Filed Oct. 13, 1961, Ser. No. 144,899
11 Claims. (Cl. 280—507)

This invention relates to a novel and useful trailer hitch and more specifically to a trailer hitch for pivotally securing the forward end of a first vehicle to the rear end of a second towing vehicle.

The trailer hitch of the instant invention includes first and second hitch members adapted to be secured to the forward and rear ends of a draft and towing vehicle and each is provided with an extended end portion provided with means for engagement with the other and constituting a pivotal connection between the first and second hitch members. A movably releasable retaining means is operatively associated with the extended end portions of the first and second hitch elements engaged with each and prevents disengagement of the extended end portions from each other.

While the preceding may be said to be conventional, the trailer hitch of the instant invention further includes first and second guide means carried by the first and second hitch members and further guide means carried by the movably releasable retaining means and elongated lock means is releasably engaged with the first, second and third guide means preventing movement of the third guide means relative to the first and second guide means sufficient to enable disengagement of the retaining means from the extended end portions of the first and second hitch members to terminate the pivotal connection established therebetween.

Means is provided for retaining the elongated locking means in locking engagement with the first, second and third guide means and it is in this manner that the trailer hitch of the instant invention differs substantially from conventional types of trailer hitches.

While substantially all trailer hitches are provided with first and second hitch elements and removably releasable retaining means for retaining portions of the first and second hitch elements or members in connection with each other for establishing a pivotal connection therebetween and it is required by substantially all state motor vehicle codes that a safety chain be connected between the towing vehicle and a draft vehicle, the trailer hitch of the instant invention utilizes the normally provided safety chain to also prevent movement of the movably releasable retaining means for the pivotal connection established between the first and second hitch member sufficient to enable disengagement of the first and second hitch members or elements from each other. Accordingly, it may thus be seen that the trailer hitch of the instant invention utilizes the conventional safety chain not only as a means for maintaining a towed vehicle connected to a towing vehicle in the event of failure of a hitch assembly between the two vehicles, but also as a means to prevent the conventional movably releasable retaining means which normally maintains the two hitch elements in engagement with each other from moving a distance sufficient to enable normal disengagement of the pair of hitch members or elements comprising the trailer hitch assembly.

It is thus to be understood that the main object of this invention is to provide a means for rendering various conventional types of trailer hitches more reliable by insuring that the hitch members thereof will not accidentally be disengaged from each other in the conventional manner.

A further object of this invention, in accordance with the preceding object, is to provide a trailer hitch assembly including certain novel safety features which may be readily incorporated into various types of existing trailer hitch assemblies.

A final object to be specifically enumerated herein is to provide a trailer hitch in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the trailer hitch of the instant invention shown with one of the hitch members thereof secured to the frame of a towing vehicle, parts of the towing vehicle and hitch assembly being broken away and shown in section;

FIGURE 2 is a perspective view of a modified form of trailer hitch assembly;

FIGURE 3 is an exploded fragmentary perspective view of the hitch assembly illustrated in FIGURE 1;

FIGURE 4 is an enlarged longitudinal vertical sectional view taken substantially upon the plane indicated by the section line 4—4 of FIGURE 1;

FIGURE 5 is an enlarged transverse vertical sectional view taken substantially upon the plane indicated by the section line 5—5 of FIGURE 1;

FIGURE 6 is an enlarged vertical transverse sectional view taken substantially upon the plane indicated by the section line 6—6 of FIGURE 1;

FIGURE 7 is a fragmentary perspective view of a further modified form of hitch assembly similar to that illustrated in FIGURES 1 and 3 through 6, and FIGURE 8 is an enlarged fragmentary longitudinal vertical sectional view taken substantially upon a plane passing along the longitudinal center line of the embodiment of FIGURE 2.

Referring now more specifically to the drawings, the numeral 10 generally designates the frame of a towing vehicle to which a first hitch member generally referred to by the reference numeral 12 is secured in any convenient manner. The frame 10 includes a rear cross member 14 and the first hitch member 12 is elongated and has its forward end secured to the transverse frame member 14.

The rear end of the first hitch member 12 has a horizontally disposed and rearwardly opening slot 16 formed therein defining a bifurcated rear end portion generally referred to by the reference numeral 18 whose furcations 20 and 22 define generally parallel and horizontally disposed flanges.

As can best be seen from FIGURE 4 of the drawings the flanges 20 and 22 are each provided with an opening 24 and it may be observed that the openings 24 are aligned.

A second hitch member generally referred to by the reference numeral 26 is provided and is also elongated. The rear end portion 28 of the hitch member 26 may be secured to the forward portion of a towing vehicle (not shown) in any convenient manner such as by welding and it will be noted that the second hitch member 26 includes a plate-like body 30. The forward end of the plate-like body 30 defines a generally horizontally disposed flange 32 which is receivable between the flanges 20 and 22 and has an opening 34 formed therethrough which is registrable with the openings 24.

The flanges 20, 22 and 32 define means constituting a pivotal connection between the hitch members 12 and 26 and a movably releasable retaining means in the form of a headed pivot fastener is generally referred to by the reference numeral 36 and includes a diametrically reduced shank portion 38 which is rotatably receivable through the aligned openings 24 and 34 and a diametrically enlarged head portion 40 which is provided with an eye portion 42.

A pair of generally U-shaped brackets referred to in general by the reference numerals 46 and 48 include bight portions 50 and 52 which are secured to the hitch members 12 and 26 respectively by means of threaded fasteners 54. Each of the hitch members 12 and 26 includes a pair of vertical bores 56 and each bight portion of brackets 46 and 48 includes a pair of vertical bores 58 which are registrable with the corresponding bores 56. The threaded fasteners 54 are secured to the registered bores 56 and 68.

The adjacent legs 60 and 62 of the U-shaped brackets 46 and 48 each has an aperture 64 formed therethrough and the eye portion 42 also defines an aperture 66 which is registrable with the apertures 64.

The remote legs 68 and 70 having upwardly opening slots 72 and 74 respectively formed therein and it will be noted that a length of link chain comprising a plurality of links 76 and generally designated by the reference numeral 78 is passed through the aligned apertures 64 and 66.

It will be further noted that a link 76 of the link chain 78 is slidably received within each of the slots 72 and 74 whereby the length of link chain 78 is engaged by means of the legs 68 and 70 to prevent longitudinal shifting of the link chain 78 relative to the trailer hitch 12.

With attention now directed to FIGURE 5 of the drawings it will be noted that the furcations 80 and 82 of each of the legs 68 and 70 snugly embrace the link 76 passing therebetween and prevent movement of the links 76 adjacent the link 76 embraced thereby from passing between the furcations 80 and 82.

Each of the furcations 82 has a retaining lever 84 pivotally secured thereto as by a pivot fastener 86 and it will be noted that each of the retaining levers 84 includes a hooked end portion 88 for preventing movement of the link chain 78 outwardly of the corresponding notch 72. Additionally, it will be noted that the body portion 90 of the retaining lever 84 comprises an abutment for engagement with the link chain 78 to prevent movement of the retaining lever 84 to the dotted position in FIGURE 5 which will enable the link chain 78 to be moved from between the furcations 80 and 82. Additionally, it will be noted that the body portion 90 of the retaining lever 84 is normally urged to a downwardmost position relative to the hooked end portion 88 thereby enabling the retaining levers 84 to each be pivoted to the latched position as illustrated in solid lines in FIGURE 5 by means of gravity.

In addition to being retained in the locking position by means of the retaining levers 84, it may be seen from FIGURE 1 of the drawings that the end of the link chain 78 adjacent the main frame 10 may be secured to the latter by means of an anchor plate 92. The remote end of the link chain 78 may be secured to the towed vehicle in any convenient manner.

With attention now directed to FIGURE 2 of the drawings there will be seen a modified form of trailer hitch generally referred to by the reference numeral 94 which utilizes the conventional socket hitch member generally referred to by the reference numeral 96 and ball hitch member generally referred to by the reference numeral 98. The conventional ball and socket joint trailer hitch 94 is provided with a threaded fastener 102 which projects upwardly out of the socket portion 100 of the socket member 96. In FIGURE 2 the threaded fastener 102 may be seen to include a diametrically enlarged heat portion 104 on which there is secured an eye portion 106. The lower end of the threaded fastener 102 is threadedly engaged in a non-circular nut 103 received in a corresponding downwardly opening socket 105 formed in a ball-retaining member 107 through which the fastener 102 extends. Other than the modified form of threaded fastener 102 and the securement of generally U-shaped brackets referred to in general by the reference numerals 108 and 110 to the hitch members 96 and 98 respectively, which brackets 108 and 110 are similar to brackets 46 and 48, the hitch 94 is conventional in design. Accordingly, it may be seen that the hitch 94 has been modified only by the addition of the special type threaded fastener 102 which is provided with the eye portion 106 and the addition of the brackets 108 and 110. After thus being modified, the hitch 94 may utilize the conventional type of safety chain 112 as the link chain for passing through the brackets 108 and 110 and the eye portion 106 in a manner similar to that in which the link chain 78 is passed through the brackets 46 and 48 and the eye portion 42.

With reference now to FIGURE 7 of the drawings, there will be seen a modified form of bracket generally referred to by the reference numeral 114 which is substantially L-shaped in configuration and includes a horizontal leg 116 secured to the hitch member 18′ by means of a suitable fastener 118 similar to fasteners 54. However, the bracket 114 is provided with a backturned portion 120 with which the end link 122 of the link chain 124 is permanently engaged. It is to be understood that a hitch member similar to hitch member 26 may be used in connection with hitch member 18′. Further, the end of the link chain 124 remote from the backturned end portion 120 may be secured to the bracket of such a hitch member similar to hitch member 26 in the same manner in which the corresponding end of the link chain 78 is secured to the bracket 48 of the hitch member 26.

Accordingly, it may be seen that herein described is a trailer hitch which utilizes the normally provided and conventional safety chain as a means for preventing accidental disengagement of two hitch members from each other which are normally secured together by means of a movable retaining means such as those retaining means set forth hereinbefore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer hitch for pivotally securing the forward end of a first vehicle to the rear end of a second towing vehicle, said hitch comprising first and second hitch members adapted to be secured to the forward and rear ends of said first and second vehicles respectively and to have an extended end portion projecting forwardly and rearwardly of said first and second vehicles respectively, movably releasable means carried by said end portions engaged with each other and constituting a pivotal connection therebetween, first and second guide means carried by said first and second hitch members adjacent said movably releasable means, said movably releasable means including third guide means, and elongated lock means releasably engaged with said first, second and third guide means and preventing movement of said third guide means relative to said end portions sufficient to enable disengagement of said movably releasable means from said pivotal connection means.

2. A trailer hitch for pivotally securing the forward end of a first vehicle to the rear end of a second towing vehicle, said hitch comprising first and second hitch members adapted to be secured to the forward and rear ends of said first and second vehicles respectively and to have an extended end portion projecting forwardly and rearwardly of said first and second vehicles respectively, movably releasable means carried by said end portions engaged with each other and constituting a pivotal connection therebetween, first and second guide means carried by said first and second hitch members adjacent said movably releasable means, said movably releasable means including third guide means, and elongated lock means releasably engaged with said first, second and third guide means and preventing movement of said third guide means relative to said end portions sufficient to enable disengagement of said movably releasable means from said pivotal connection means, said extended end portions each having an opening formed therethrough and being overlapped and disposed in sliding contacting relation with each other, said movably releasable means including a headed pivot fastener having a diametrically reduced shank portion passed through said openings.

3. A trailer hitch for pivotally securing the forward end of a first vehicle to the rear end of a second towing vehicle, said hitch comprising first and second hitch members adapted to be secured to the forward and rear ends of said first and second vehicles respectively and to have an extended end portion projecting forwardly and rearwardly of said first and second vehicles respectively, movably releasable means carried by said end portions engaged with each other and constituting a pivotal connection therebetween, movably releasable retaining means operatively associated with said pivotal connection means and preventing disengagement of said pivotal connection constituting means from each other, first and second guide means carried by said first and second hitch members adjacent said retaining means, said retaining means including third guide means, and elongated lock means releasably engaged with said first, second and third guide means and preventing movement of said third guide means relative to said first and second guide means sufficient to enable disengagement of said retaining means from said pivotal connection constituting means, one of said extended end portions comprising a ball member and the other of said end portions comprising a sectional socket member having a movable end portion section and said retaining means comprising a headed threaded fastener threadedly engaged with said movable section for moving the latter into a position retaining said ball member captive within said socket member.

4. The combination of claim 2 wherein said first and second guide means include flanges having apertures formed therein, said third guide means comprising an eye portion on the head of said fastener, said elongated lock means comprising a length of a flexible tension member passed through said apertured flanges and said eye portion.

5. The combination of claim 4 wherein said apertured flanges are disposed on opposite sides of said fastener and said eye portion and apertures are registrable.

6. The combination of claim 5 wherein said flexible tension member comprises a length of link chain slidably received through said apertures and eye portion.

7. The combination of claim 6 including means carried by each of said hitch members securing the corresponding end of said link chain through the corresponding aperture.

8. The combination of claim 7 wherein at least one of said securing means includes means for releasably securing the corresponding end of said link chain to the associated hitch member.

9. The combination of claim 3 wherein said first and second guide means include flanges having apertures formed therein, an eye portion on the head of said fastener, said elongated lock means comprising a length of a flexible tension member passed through said apertured flanges and said eye portion.

10. The combination of claim 9 wherein said apertured flanges are disposed on opposite sides of said fastener and said eye portion and apertures are registrable.

11. The combination of claim 10 wherein said flexible tension member comprises a length of link chain slidably received through said apertures and eye portion.

References Cited in the file of this patent

UNITED STATES PATENTS

| | | |
|---|---|---|
| 2,668,723 | Krefting | Feb. 9, 1954 |
| 2,705,157 | Dial | Mar. 29, 1955 |